United States Patent
Sivik et al.

(10) Patent No.: US 8,097,047 B2
(45) Date of Patent: Jan. 17, 2012

(54) FABRIC COLOR REJUVENATION COMPOSITION

(75) Inventors: Mark Robert Sivik, Mason, OH (US); Allison Lynn Gerdes, Mason, OH (US); Gayle Marie Frankenbach, Cincinnati, OH (US); Gregory T. Waning, Fairfield, OH (US); Ramanan Venkata Ganapathysundaram, Blue Ash, OH (US); Michael Timothy Creedon, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 257 days.

(21) Appl. No.: 12/322,796

(22) Filed: Feb. 6, 2009

(65) Prior Publication Data

US 2009/0249562 A1 Oct. 8, 2009

Related U.S. Application Data

(60) Provisional application No. 61/072,688, filed on Apr. 2, 2008.

(51) Int. Cl.
*D06P 1/38* (2006.01)
*D06P 5/00* (2006.01)

(52) U.S. Cl. .......... 8/441; 8/115.51; 8/115.6; 8/401; 8/543; 8/594; 8/614; 8/669; 8/681; 252/8.91

(58) Field of Classification Search .......... 252/8.91; 8/115.6, 115.51, 681, 401, 441, 543, 594, 8/614, 669
See application file for complete search history.

(56) References Cited

U.S. PATENT DOCUMENTS

| | | | |
|---|---|---|---|
| 3,120,422 A * | 2/1964 | Weir | 8/484 |
| 4,254,520 A | 3/1981 | Saurman | |
| 5,279,622 A | 1/1994 | Stawitz et al. | |
| 6,726,731 B2 * | 4/2004 | Pettifer et al. | 8/549 |
| 7,127,874 B2 | 10/2006 | Viltro et al. | |
| 7,829,517 B2 * | 11/2010 | Brooker | 510/340 |
| 2002/0108184 A1 | 8/2002 | Pettifer et al. | |
| 2005/0034432 A1 | 2/2005 | Kroese et al. | |
| 2005/0215457 A1 * | 9/2005 | Becks et al. | 510/438 |

FOREIGN PATENT DOCUMENTS

| | | |
|---|---|---|
| EP | 896052 A1 | 2/1999 |
| EP | 947443 A1 | 10/1999 |
| GB | 2324495 A | 10/1998 |
| GB | 2332442 A | 6/1999 |
| GB | 2361685 A | 10/2001 |
| GB | 2361686 A | 10/2001 |
| GB | 2361687 A | 10/2001 |
| GB | 2361688 A | 10/2001 |
| GB | 2361689 A | 10/2001 |
| GB | 2361690 A | 10/2001 |
| GB | 2361707 A | 10/2001 |
| WO | WO99/50381 A1 | 10/1999 |
| WO | WO99/55821 A1 | 11/1999 |
| WO | WO99/55822 A1 | 11/1999 |
| WO | WO 99/66019 A1 | 12/1999 |
| WO | WO01/83667 A1 | 11/2001 |
| WO | WO01/85898 A1 | 11/2001 |
| WO | WO01/83657 A3 | 3/2002 |
| WO | WO 2007/113579 * | 10/2007 |

OTHER PUBLICATIONS

International Search Report, International Application No. PCT/US2009/039115, mailed Mar. 17, 2010, 4 pages.

* cited by examiner

*Primary Examiner* — Lorna M Douyon
*Assistant Examiner* — Amina Khan
(74) *Attorney, Agent, or Firm* — Julie A. McConihay; Andrew J. Mueller

(57) ABSTRACT

Rejuvenation compositions including a reactive dye are disclosed for the one-shot rejuvenation of the color for dark-colored textile fabrics and garments formed therefrom. The rejuvenation compositions return faded black or dark colored garments to a like-new look. Methods of rejuvenating the faded color of garments by using the dye compositions are also disclosed.

10 Claims, 6 Drawing Sheets the compositions described herein are unsuitable for providing an acceptable rejuvenation, in three or fewer treatments and in a method convenient for casual use by a broader group of consumers. These problems may limit the market appeal of such products. Thus, there is a need for a product that provides efficient dye uptake in three or fewer treatments which incorporates synergistic adjunct additives and which is convenient and easy to use by consumers and environmentally safe.

FABRIC COLOR REJUVENATION COMPOSITION

CROSS REFERENCE TO RELATED APPLICATION

This application claims priority under 35 U.S.C. § 119(e) to U.S. Provisional Application Ser. No. 61/072,688, filed Apr. 2, 2008.

FIELD OF THE INVENTION

This disclosure relates to a single-use dye composition capable of rejuvenating the color and texture of faded textile garments. Methods of use are also disclosed.

BACKGROUND OF THE INVENTION

When dyed textile garments are exposed to environmental conditions or repeatedly laundered with exposure to various detergent products, the original color may fade to a lighter, less intense color. Detergent ingredients, such as surfactant and bleach, pH and other conditions used in the laundering process, such as water temperature, agitation, and abrasion may contribute to the problem of color loss from the fabric. In addition, exposure to certain environmental conditions, such as exposure to UV light may lead to breakdown of dye molecules in the fabric. Finally, general usage of the garments may lead to dye loss from the outer fibers of the textile threads. All of these processes may lead the garment or fabric to have a dull, faded appearance.

While detergent formulations and conditions of the washing process are typically optimized for fabric cleaning, they may be detrimental to fabric color care and can cause dyed fabrics to lose color and fade. To overcome this problem, the laundry industry has been moving toward detergents with improved fabric color care benefits. Typically these detergents are bleach free and may comprise detergent ingredients which may help keep the dye bound to the surface of the colored fabric during the washing process. Nevertheless, fabric color typically fades upon repeated exposure to laundering conditions.

Dark colors, such as fabrics colored with black-dyes and/or combinations of dyes to result in a "true black" fabric color, may be particularly susceptible to fading or loss of color. For example, consumers may notice significant color loss in a black-dyed garment after several wash cycles. As the color of the fabric fades or dulls, the consumer may determine that it is no longer desirable to wear the garment, resulting in disposal or non-use of the garment.

Products for dying textiles are known but may contain phosphates, such as Wash & Dye Black (commercially available from Dylon International Ltd., London, UK), or other formulations making them unsuitable for use in certain countries where the incorporation of phosphates into fabric care compositions is restricted. Further, certain of these products may possess formulations which are not designed for use with reactive dye compositions under conditions that result in optimal dye uptake by the garment. Also, certain dye compositions may possess a liquid formulation which may result in difficulty measuring the dye or messy applications. In addition, these products do not possess other technologies that can act synergistically with the dye to result in a more intense rejuvenation of the color of the dyed fabric.

Many of the products currently designed for use with the home washing machine are intended for "hobbyists" and are sold primarily in hobby and craft outlets. These products often comprise complex instructions or require the consumer to use several ingredients or add more than one composition. The prior art approaches described herein are unsuitable for providing an acceptable rejuvenation, in three or fewer treatments and in a method convenient for casual use by a broader group of consumers. These problems may limit the market appeal of such products. Thus, there is a need for a product that provides efficient dye uptake in three or fewer treatments which incorporates synergistic adjunct additives and which is convenient and easy to use by consumers and environmentally safe.

SUMMARY OF THE INVENTION

Embodiments of the present disclosure generally relate to one-shot rejuvenation dye compositions.

In one embodiment, the present disclosure provides a composition comprising all components necessary to provide improved rejuvenation performance to fabrics of dark color, especially black, in three or fewer treatments in a form convenient for casual use by the consumer. In one embodiment, the present disclosure provides a textile rejuvenation composition which comprises from about 5.0% to about 30.0% by weight of a reactive dye composition, from about 35.0% to about 90.0% by weight of a water soluble salt, from about 5.0% to about 40.0% by weight of an alkali base, from about 0% to about 10% by weight of a surfactant, and from about 0% to about 1.0% by weight of an enzyme, wherein the composition is substantially free of phosphates.

In other embodiments, the present disclosure provides methods of rejuvenating a color of a textile. The method comprises treating the textile with the textile rejuvenation composition according to the various embodiments disclosed herein.

Still other embodiments of the present disclosure provide a single-use textile rejuvenation system. The system comprises a dye component comprising a reactive dye composition, a surfactant and an enzyme and a salt component comprising a water soluble salt and an alkali base.

Further embodiments of the present disclosure provide a single-use method for rejuvenating the color of textile garments in a front-loader type washing machine or a top-loader type washing machine. The method comprises adding a dosage unit of a textile rejuvenation composition, such as, the compositions described herein, including one comprising a reactive dye, a water soluble salt, an alkali base and an enzyme, to a wash compartment, adding water having a temperature ranging from about 30° C. to about 50° C. to the wash compartment to product a rejuvenation mixture, agitating the rejuvenation mixture for a time sufficient to disperse the textile rejuvenation composition in the rejuvenation mixture, adding from 1 to 5 garments (having a total weight ranging from 500 g to 1000 g) to the wash compartment, agitating the garments in the rejuvenation mixture for a time sufficient to fully contact the rejuvenation mixture with the garments, soaking the garments in the rejuvenation mixture for sufficient time to allow the reactive dye to react with the garments, draining the rejuvenation mixture from the wash compartment, rinsing the garments with water, and treating the garments to a wash/rinse cycle using a cold setting without additional cleaning/treating products.

In a further aspect of the present disclosure, a rejuvenation composition suitable for use in a professional laundering environment for the professional rejuvenation of fabrics is provided. In these embodiments provide a single-use method for rejuvenating the color of textile garments in a commercial washing facility. The method comprises adding a dosage unit of a textile rejuvenation composition, such as, an of the compositions described herein, including one comprising a reactive dye, a water soluble salt, an alkali base and an enzyme, to a wash compartment, adding water having a temperature ranging from about 30° C. to about 70° C. to the wash compartment to product a rejuvenation mixture, agitating the rejuvenation mixture for a time sufficient to disperse the textile rejuvenation composition in the rejuvenation mixture, adding from 1 to 5 garments (having a total weight ranging from 500 g to 1000 g) to the wash compartment, agitating the garments in the rejuvenation mixture for a time sufficient to fully contact the rejuvenation mixture with the garments, soaking the garments in the rejuvenation mixture for sufficient time to allow the reactive dye to react with the garments, draining the rejuvenation mixture from the wash compartment, rinsing the garments with water, and treating the garments to a wash/rinse cycle using a cold setting without additional cleaning/treating products.

In another aspect of the present disclosure the efficiency and performance of the rejuvenation composition are improved by the addition of one or more synergistic adjunct additives, such as depilling/defuzzing agents and/or pH control agents. In still another aspect, the convenience of use of the rejuvenation composition is increased by incorporating at least a portion of the rejuvenation composition into a convenient dosing device or container. According to these aspects, the portion of the rejuvenation composition may be contained within the dosing device or container until the point of use, for example to provide ease of dosage and/or to prevent accidental staining of surfaces. In still other aspects, environmental safety issues related to restrictions on the use of phosphates in laundering processes are solved by making the compositions essentially free of phosphates.

BRIEF DESCRIPTION OF THE DRAWINGS

The various embodiments set forth in the Description of the Invention will be better understood with reference to the following drawings, wherein.

DETAILED DESCRIPTION OF THE INVENTION

A. Definitions

Figure 1A:
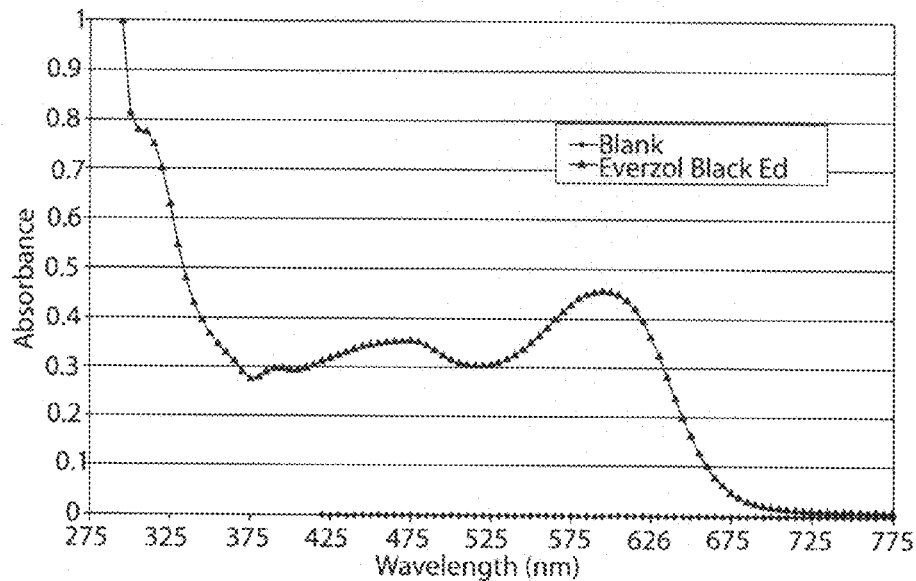
FIG. 1a illustrates the UV spectra of EVERZOL® Black ED.

As used herein, the term "comprising" means various components conjointly employed in the preparation of the compositions of the present disclosure. Accordingly, the terms "consisting essentially of" and "consisting of" are embodied in the term "comprising".

As used herein, the term "rejuvenation" means restoring the color of a faded dyed textile to a color that is closer to the original dyed color of the textile.

As used herein, the term "additive" means using the compositions during the laundry process to dye a faded dyed textile to a color that is closer to the original dyed color of the textile.

As used herein, the term "one-shot" means a one time use of the composition to rejuvenate the color of a dyed garment. The term "one-shot" should not be interpreted as limiting the use of the composition to a single use. For example, a garment may be retreated with the dye compositions disclosed herein after the color of the garment has faded due to wearing/washing the garment after a first rejuvenation process.

As used herein, the term "reactive dye" means a chemical dye composition that reacts to form a chemical bond, such as a covalent, polar-covalent, coordinate-covalent, or ionic bond, with the fabric fibers.

As used herein, the term "true black" means a dye or combination of dyes that result in a color that is viewed by the consumer as having a black color. Measurement of true black is referenced to a standard black glass slide available from Hunter Associates Laboratory, Reston Va. The scale is established with black set at 0 and white set at 100. A white glass slide standard is also available from Hunter Associates Laboratory. The measurements may be made using the 10 degree standard observer function with light sources D65 and Illuminant A.

As used herein, the term "top-loader washing machine" means a washing machine in which the garments to be washed are loaded from the top. Top-loader washing machines typically have a wash capacity ranging from about 30 liters to about 85 liters.

As used herein, the term "front-loader washing machine" means a washing machine in which the garments to be washed are loaded through a door in the front of the machine. Front-loader washing machines typically have a wash capacity ranging from about 10 liters to about 80 liters.

As used herein, the term "Miele-type washing machine" refers to a type of washing machine used in certain European countries or other countries, such as those produced by Miele & Cie. of Gutersloh, Germany. Miele-type washing machines have a wash capacity ranging from about 5 liters to about 30 liters. The term "Miele-type washing machine" should not be construed as being limited to those washing machines produced by Miele & Cie. but should be read to include all washing machine brands having a reduced washing volume compared to front- or top-loader washing machines as described herein.

As used herein, the term "hand wash" refers to any procedure where the fabric or textile is treated by hand in a sink, basin, bowl, bag, pan, or any other suitable container where the fabric or textile is treated in volumes ranging from about 100 mL to about 15 liters of wash water capacity.

As used herein, the "L*C*h color space" and "L*a*b* color space" are three dimensional calorimetric models developed by Hunter Associates Laboratory and recommended by the Commission Internationale d'Eclairage ("CIE") to measure the color or change in color of a dyed article. The CIE L*a*b* color space ("CIELAB") has a scale with three-fold axes with the L axis representing the lightness of the color space (L*=0 for black, L*=100 for white), the a* axis representing color space from red to green (a*>0 for red, a*<0 for green) and the b* axis representing color space from yellow to blue (b*>0 for yellow, b*<0 for blue). The L*C*h color space is an approximately uniform scale with a polar color space. The CIE L*C*h color space ("CIELCh") scale values are determined instrumentally and may also be calculated from the CIELAB scale values. The L* lightness value is the same for both the CIELCh and CIELAB color scales. The C* value (chroma value) and the h value (hue angle) may be calculated from the a* and b* values of the CIELAB scale. All colors may be represented by a coordinate in the L*a*b* color space and changes in colors may be represented by the vector corresponding to the coordinate difference between an initial color and a final color. Term definitions and equation derivations are available from Hunter Associates Laboratory, Inc. and from www.hunterlab.com, and are incorporated in their entirety by reference herein.

As used herein, the terms "fabric", "cloth" and "garment" all relate to textile compositions made of a flexible material comprising a network of natural and/or artificial fibers, such as threads or yarns. The textile compositions have typically been treated by a dying process to impart a color to the fibers.

B. Process and Composition

According to one embodiment, the present disclosure provides for a textile rejuvenation composition comprising from about 5.0% to about 30.0% by weight of a reactive dye compositions, from about 35.0% to about 90.0% by weight of a water soluble salt, from about 5.0% to about 40.0% by weight of an alkali base, from 0% to about 1.0% by weight of a surfactant, and from 0% to about 1.0% by weight of an enzyme. According to these embodiments, the textile rejuvenation composition may be substantially free of phosphates.

Textiles may be colored with dyes to impart a particular color or color to the fiber network. One effective method of dying involves treating a textile with a reactive dye. Reactive dyes have chemical functionality that reacts with chemical functionality in the textile fiber to form a chemical bond between the dye and the fiber, thereby attaching the dye chromophore to the fiber structure. Reactive dyes are effective dying agents leading to a textile product with a high degree of color fastness. Other dye types are known but may lead to a lower degree of color fastness, particularly with natural fibers such as cotton or other cellulose fibers.

In certain embodiments, the reactive dye composition may comprise a reactive azo dye. One example of a reactive dye composition is EVERZOL® Black ED dye (commercially available from Everlight Chemical Industrial Corp., Pineville, N.C.) which is a blend of several dyes including Reactive Black 5, and one or more of a reactive yellow dye, a reactive orange dye, a reactive red dye, and a reactive green dye that gives a "true black" color to the dyed article. Other suitable reactive dye compositions include those reactive dye compositions disclosed in U.S. Pat. No. 6,126,700. According to certain embodiments, the reactive dye compositions used herein may comprise from 50% to about 100% of a reactive black dye with the remainder of the dye composition comprising one or more reactive dyes having a different color (as measured by an absorption spectrum). Certain reactive dyes, such as Reactive Black 5, react under alkaline conditions to form the reactive form of the dye which may then react with a hydroxyl group on the textile fiber to covalently attach the dye chromophore to the fiber structure. One having ordinary skill in the art will recognize that other reactive dye compositions, including other reactive dye compositions with similar reactive groups as Reactive Black 5 (i.e., functional groups that are reactive under similar chemical conditions) may be used, instead of or in addition to Reactive Black 5, in various embodiments of the present disclosure without deviating from the scope of the present disclosure. For example, dyes of other colors may be used, such as in a process for rejuvenating colored garments.

Figure 1B:
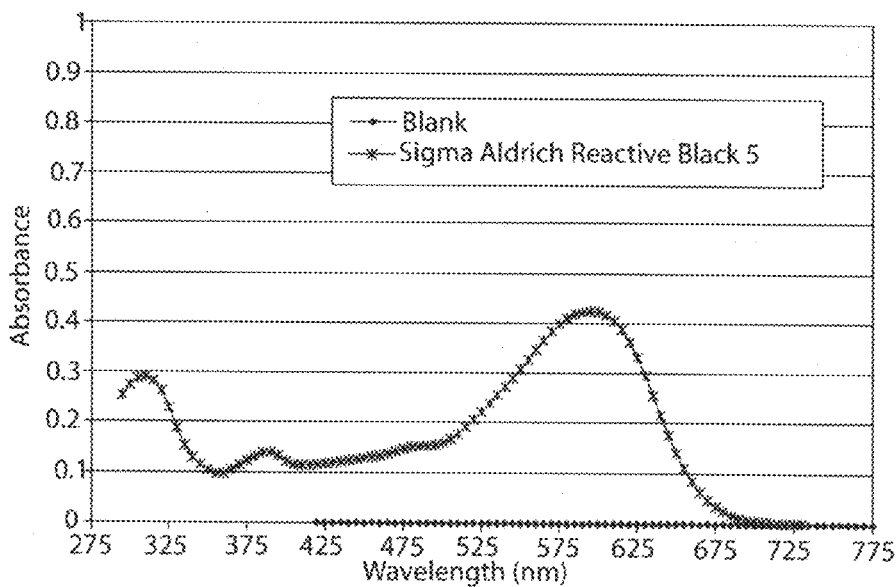
FIG. 1b illustrates the UV spectra of Reactive Black 5.
Figure 1C:
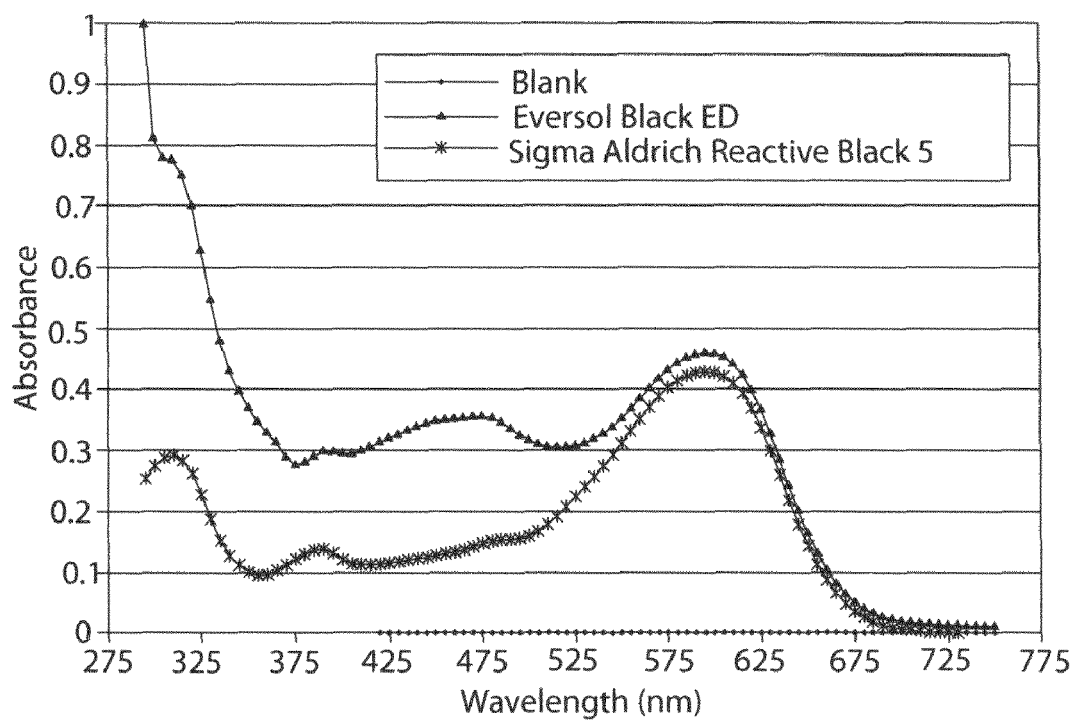
FIG. 1c illustrates the comparison of UV spectra of Reactive Black 5 and EVERZOL® Black ED.

According to certain embodiments where the reactive dye composition comprises a reactive black dye and has a true black color, the reactive dye composition may have a UV spectrum having several peaks corresponding to one or more dye in the composition to yield a true black color. For example, in one example of a black composition the spectra may display one $\lambda_{max}$ extinction coefficient ranging from 40,000 to 45,000 at a $\lambda_{max}$ ranging from 585 nm to 600 nm, a second λ peak at 465 nm to 485 nm, and a third λ peak at 380 nm to 460 nm. Two exemplary UV spectra of reactive dye compositions according to certain embodiments of present disclosure are illustrated in FIG. 1a and FIG. 1b. FIG. 1a displays the UV spectrum of EVERZOL® Black ED and FIG. 1b displays the UV spectrum of Reactive Black 5.

In certain embodiments, the rejuvenation composition may comprise from about 5.0% to about 30.0% by weight of the reactive dye composition. In other embodiments, the rejuvenation composition may comprise from about 5.0% to about 20% by weight of the reactive dye composition. In another embodiment, the rejuvenation composition may comprise from about 10.0% to about 15.0% by weight of the reactive dye composition.

According to various embodiments, the textile rejuvenation composition comprises from about 35.0% to about 90.0% by weight of a water soluble salt. In other embodiments, the rejuvenation composition may comprise from about 35.0% to about 65.0% by weight of a water soluble salt. In other embodiments, the rejuvenation composition may comprise from about 55.0% to about 90.0% by weight of a water soluble salt. In still other embodiments, the rejuvenation composition may comprise from about 55.0% to about 65.0% by weight of a water soluble salt. In still yet another embodiment, the salt may be omitted from the textile rejuvenation composition but added during the method of using the rejuvenation composition, for example, added by the user or consumer. In various embodiments, the water soluble salt may be selected from the group consisting of a sodium salt, a magnesium salt, a calcium salt, a potassium salt, a lithium salt, an aluminum salt, a zinc salt, a sulfate salt, a chloride salt, a bromide salt, a carbonate salt, a bicarbonate salt, a silicate salt, a metasilicate salt, a bisulfate salt, a nitrate salt, an acetate salt, a carboxylate salt, a formate salt, and combinations of any thereof. According to certain embodiments, the water soluble salt may be a sodium salt selected from the group consisting of sodium chloride, sodium acetate, a sodium carboxylate, sodium formate, and combinations of any thereof. While not intending to be limited by any particular theory, it is believed that the water soluble salt increases the ionic strength character of the solution formed with the rejuvenation composition is dissolved in water inside the washing machine, which may be necessary for acceptable bonding between the reactive dye composition and reactive functionality in the textile fibers and to drive the dye out of solution and onto the fiber to allow the reactive dye to react with the fiber. Further, according to the various embodiments, the salt may not comprise a phosphate salt. Residual phosphate salts may lead to certain undesired environmental effects and their use has been restricted in certain countries. Thus, the embodiments of the present disclosure provide for effective dye uptake without the use of phosphate or phosphorus containing salts.

The textile rejuvenation compositions described herein also comprise an alkali base. The textile rejuvenation compositions may comprise sufficient alkali base such the dye solution formed when the rejuvenation composition is dissolved in water inside the washing machine has a pH ranging from about 9 to about 13.5. In other embodiments, the pH of the dye solution may be from about 11 to about 12. For example, in certain embodiments, the dye solution may result from dissolving from about 50 g to about 500 g of the textile rejuvenation composition in about 5 L to about 15 L of water. In other embodiments, the dye solution may result from dissolving from about 100 g to about 1000 g of the textile rejuvenation composition in about 30 L to about 40 L of water. While not intending to be limited by any interpretation, it is believed that the high pH, for example, a pH greater than 9 (such as from 9 to 13.5), is necessary for acceptable dye uptake by the textile fiber. In other embodiments a pH of greater than 11 (such as from 11 to 12) may result in acceptable dye uptake by the textile fiber. In certain reactive dyes of the present disclosure, alkaline conditions may be necessary to activate the reactive dye to react with functionality on the fiber. For example, for Reactive Black 5, alkaline reaction conditions are believed to result in an elimination to form an $\alpha,\beta$-unsaturated sulfone with which a hydroxyl or other nucleophilic functionality on the textile fiber reacts to bond the dye molecule to the fiber.

In certain embodiments, the rejuvenation composition may comprise from about 5.0% to about 40.0% by weight of an alkali base. In other embodiments, the rejuvenation composition may comprise from about 5.0% to about 10.0% by weight of an alkali base. In other embodiments, the rejuvenation composition may comprise from about 20.0% to about 40.0% by weight of an alkali base and in certain embodiments, from about 20.0% to about 30.0% by weight of an alkali base. Suitable alkali bases include, for example, sodium hydroxide, sodium carbonate, sodium silicate, sodium bicarbonate, sodium metasilicate, and combinations of any thereof. The alkali bases may be in hydrated or anhydrous form. It will be understood by one having skill in the art that the weight percent of alkali base in the rejuvenation composition will depend, at least in part, on the basicity ($pK_b$) of the alkali base. That is, for alkali bases with higher basicity (i.e., greater $pK_b$), less weight percent of alkali base will be needed to achieve the desired pH of the dye solution. Thus, in the various embodiments, sufficient alkali base is added to achieve the desired pH for optimum reaction of the dye with the fiber.

Figure 2:
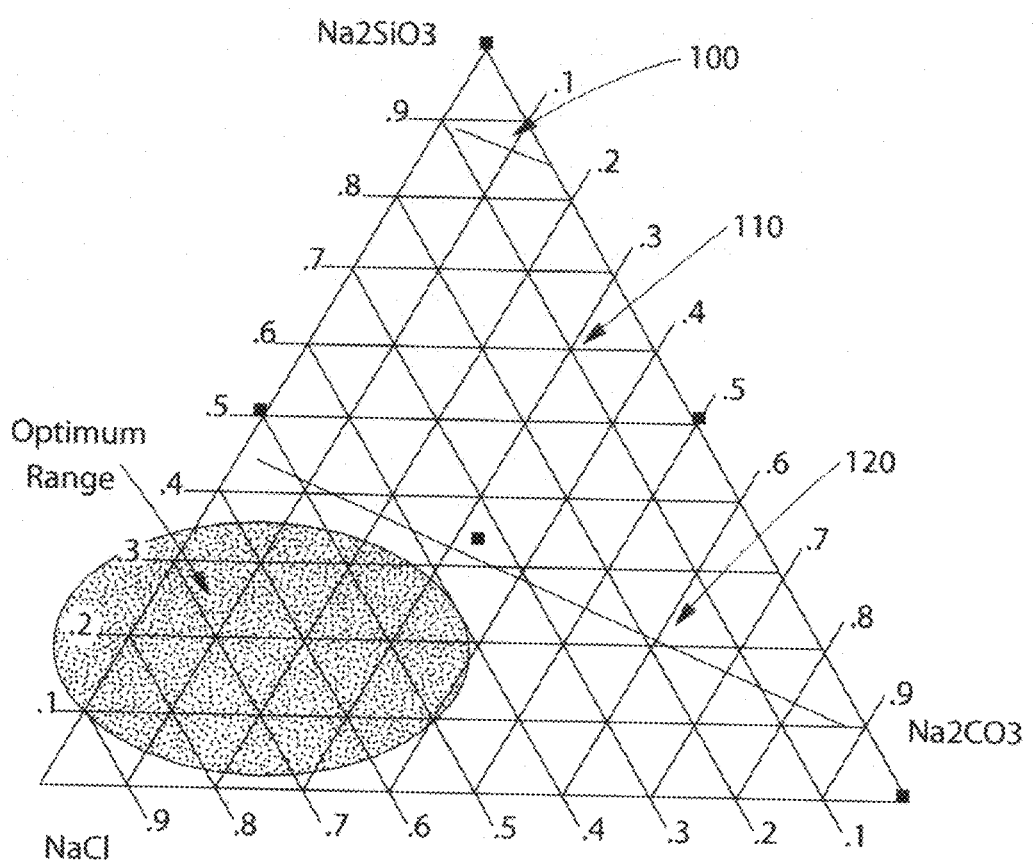
FIG. 2 illustrates a ternary diagram for a water soluble salt/alkali base formulation for one embodiment of the rejuvenation composition.

According to various embodiments, the alkali base of the rejuvenation composition is also a water soluble salt and may have an affect on the overall ionic strength of the dye solution. Thus, in certain embodiments, there may be an optimum formulation of water soluble salt and alkali base. For example, according to one embodiment where the water soluble salt is NaCl and the alkali base is $Na_2SiO_3$ or $Na_2CO_3$, there may be an optimum concentration range for a formulation of the salt and base. FIG. 2 illustrates a ternary diagram for a formulation system showing an optimum range for NaCl, $Na_2SiO_3$ and $Na_2CO_3$ concentrations for a specific embodiment of the rejuvenation composition. According to these embodiments, rejuvenation compositions having a salt/alkali base formulation having from 60% to 100% of NaCl and from 0% to 40% of $Na_2SiO_3$ and/or $Na_2CO_3$ demonstrates optimal dye deposition to achieve maximum rejuvenation and uptake of the black dye by treated garments.

The textile rejuvenation compositions of the present disclosure may also comprise a surfactant. According to certain embodiments, the rejuvenation composition may comprise from 0% to about 10.0% by weight of a surfactant. In other embodiments, the rejuvenation compositions may comprise from 0% to about 5.0% by weight of a surfactant and in certain embodiments from 0% to about 2.0% weight of the surfactant. Suitable surfactants include anionic surfactants, for example, linear alkylbenzene sulfonates (LAS), alkylsulfates (AS), alkylethoxylatesulfate (AES), dioctyl sodium sulfosuccinate (DSS), and combinations thereof. Surfactants in the rejuvenation composition may act to evenly disperse the dye and other components in the dye solution and/or to wet the fabric or garment surface for a more even dyeing of the garment. However, it should be noted that although many surfactants display a cleaning action, the embodiments of the present disclosure are not intended to clean the textile while rejuvenating the dye color and the amounts of surfactant contained in the various rejuvenation compositions described herein is generally unsuited for efficient cleaning of the textile. For example, in certain embodiments, greater surfactant concentration may inhibit dye uptake.

The textile rejuvenation compositions of the present disclosure may also comprise an enzyme. Suitable enzymes include, for example, an amylase, a protease, a lipase, a cellulase, a hemicellulase, a peroxidase, a xylanase, a phospholipase, an esterase, a cutinase, a pectinase, a keratanase, a reductase, an oxidase, a phenoloxidase, a lipoxygenase, a ligninase, a pullulanase, a tannase, a pentosanase, a malanase, a $\beta$-glucanase, an arabinosidase, a hyaluronidase, a chondroitinase, a laccase, and combinations of any thereof. In specific embodiments of the compositions, the enzyme may comprise a cellulase, including detergent enzymes, for example, CAREZYME® (commercially available from Novozymes NA, Franklinton, N.C.), RENOZYME® (commercially available from Novozymes NA, Franklinton, N.C.), CELLUCLEAN® (commercially available from Novozymes NA, Franklinton, N.C.), PURADAX® HP (commercially available from Danisco US—Genencor Division, Rochester, N.Y.), and combinations thereof. In certain embodiments, the cellulase enzyme or other enzyme may react with the fabric or fiber surface to remove or reduce fuzz and pilling of the fabric, thereby increasing fabric surface smoothness and/or dye uptake by the fabric. While not intending to be limited by any interpretation, it is believed that by reducing the fuzz or pilling on the fabric surface, the garment appears to have a truer dyed color.

The amount of the textile rejuvenation composition that is used to rejuvenate the color of dyed garments may vary according to several considerations. For example, different types of washing machines use different volumes of water during the wash cycle. For example, a typical top loader-washing machine has a wash volume ranging from about 30 L to about 40 L of water per cycle, whereas a typical front loader-washing machine has a wash volume ranging from about 10 L to about 15 L of water per cycle. In Europe or other countries, a Miele type washing machine having a wash volume ranging from about 5 L to about 10 L of water per cycle is commonly used. Therefore, the amount of rejuvenation composition that is used to treat the garments may differ depending on the washing machine type or design. That is, for washing machines with lower wash volumes, lower amounts of the rejuvenation composition may be necessary to achieve acceptable color levels in the treated garments, whereas for higher wash volume washing machines, greater amounts of the rejuvenation composition may be necessary to achieved acceptable color levels. The amount of the rejuvenation composition used for treating the garments in a washing machine may be defined as a "unit dose". According to one embodiment, the composition may have a total weight ranging from 50 g to 500 g per unit dose for a front loader-type washing machine or a Miele-type washing machine. In other embodiments, the composition may have a total weight ranging from 250 g to 450 g per unit dose for a front loader-type washing machine or a Miele-type washing machine. According to another embodiment, the composition may have a total weight ranging from 100 g to 1000 g per unit dose for a top loader-type washing machine. In other embodiments, the composition may have a total weight ranging from 500 g to 900 g per unit dose for a top loader-type washing machine.

The amount of rejuvenation composition used in a dying operation may also be represented by an optimal concentration of the rejuvenation composition in the dying solution. The concentration may be determined by the unit dose of the rejuvenation composition divided by the wash volume of the washing machine used in the dying operation. According to various embodiments, the concentration of the rejuvenation composition in the dye solution may range from about 2.0 g/L to about 60.0 g/L. In other embodiments, the concentration of the dye solution may range from about 21.2 g/L to about 53.3 g/L.

Other embodiments of the present disclosure provide for a method of rejuvenating a color of a textile. For example, methods for rejuvenating the color of a black textile garment are provided herein. The various methods may comprise treating the textile with any of the various embodiments of the textile rejuvenation compositions disclosed herein. The methods may be suitable for rejuvenating the color of textiles using a top-loader washing machine, a front-loader washing machine, or a Miele-type washing machine. In one embodiment, the method may comprise rejuvenating the color of textile garments using a top-loader washing machine, wherein the textile rejuvenation composition is added in an amount ranging from 100 g to 1000 g for dying from about 75 g to about 1000 g of the textile. In another embodiment, the method may comprise rejuvenating the color of textile garments using a front-loader washing machine or a Miele-type washing machine, wherein the textile rejuvenation composition is added in an amount ranging from 50 g to 500 g for about 75 g to about 1000 g of the textile. In other embodiments, the textile rejuvenation composition is added in an amount ranging from 300 g to 400 g for about 75 g to about 1000 g of the textile. In certain embodiments of these methods, greater amounts of textile may be treated with the rejuvenation composition, for example, up to 1500 g of the textile may be treated under conditions when a longer dye time and/or higher water temperatures are used.

According to the methods, the treated textile garment will have an improved color, such as a blacker or true black color, compared to the untreated garment. Improvement in color of the textile garment may be measured by several methods. In one approach, the improvement in the garment color may be measured by the subjective opinion of the consumer or rejuvenation composition user. For example, the consumer or composition user may be asked their opinion on the effectiveness of the rejuvenation process by rating the color rejuvenation on a scale of 1 to 4, where 1 is no observable change; 2 shows observable change but color is unacceptable; 3 shows observable change and the color is acceptable; and 4 shows observable change in color and the garment is rejuvenated to a color at or near the original color. According to consumer opinion, garments treated with the textile rejuvenation compositions by the methods of the present disclosure displayed an average consumer rejuvenation score of greater than 3.5.

In other embodiments of the methods, the color rejuvenation of a garment may be measured using an analytical colorimetric analysis, for example, using the CIELCh scale by measuring the L* or $DE^*_{CMC}$ value or using the L*a*b* CIELAB scale by measuring the L* or DE* value. As used herein, the $DE^*_{CMC}$ value includes the vector associated with the distance in the L*C*h space between the initial L*C*h value and the final L*C*h value. As used herein the DE* value includes the vector associated with the distance in the L*a*b* space between the initial L*a*b* value and the final L*a*b*. According to one embodiment of the methods, textile garments treated with the rejuvenation compositions of the present disclosure may display an L* value of less than about 15 after treatment. One exemplary optimized rejuvenation formulation recommendation may be determined, for example, on a denim fabric, by completing a series of conditions in an empirically designed experiment. Results from such an example are demonstrated in FIG. 2. The L* values of 22, 17, and 14.5, corresponding to boundary lines 100, 110, and 120, respectively, where the model predicts the L* value for the formula indicated by the coordinates on the chart (where decreasing L* values are below the lines) for a specific denim fabric. For example, an exemplary formula with a salt composition of 44% NaCl and 56% $Na_2SiO_3.5H_2O$ would have an average L* value of 14.5 for that specific denim fabric. According to these embodiments, the optimum salt and base formulation, as indicated by the shaded region in the figure, would provide garments having an L* value of less than 14.5 as indicated by line 120. In other embodiments, the textile garments treated with the rejuvenation compositions of the present disclosure may display a $DE^*_{CMC}$ value of greater than 2.5 units. A second analytical method of measuring the rejuvenation of the textile garment may involve comparing the DE* value. According to certain embodiments, textile garments treated according to the methods utilizing the various embodiments of the rejuvenation compositions of the present disclosure may display a DE* value of greater than 2.0 units.

According to certain embodiments of the methods, treating the textile with the textile rejuvenation compositions of the present disclosure may comprise treating the textile with an aqueous solution of the textile rejuvenation composition having a concentration ranging from about 2.0 g/L of aqueous wash solution to about 60.0 g/L of aqueous wash solution. Due to the nature of the rejuvenation composition, higher concentration in water via lower was water volumes/settings may lead to a higher depth shades and darker more even dyeing results. Therefore, small or low fill settings for washing machines may be used in certain embodiments. For example, in one embodiment for a top-loader type washing machine, the concentration may range for 400 g of rejuvenation composition from about 6.3 g/L (~64 L using the large load setting) to about 33.1 g/L (~10.6 L using the small load setting) of the aqueous wash solutions. In another embodiment utilizing a front-loader type washing machine, the concentration of the rejuvenation composition in the solution may range from 8.3 g/L (using 100 g of rejuvenation composition in ~12.1 L) to about 33.1 g/L (using 440 g of rejuvenation composition in ~12.1 L). In other embodiments utilizing a Miele-type washing machine, the concentration of the rejuvenation composition in the solution may range from 13.3 g/L (using 100 g of rejuvenation composition in ~7.5 L) to about 53.3 g/L (using 440 g of rejuvenation composition in ~7.5 L).

Other embodiments of the present disclosure provide for a single-use textile rejuvenation system comprising a dye component comprising a reactive dye composition, and an enzyme and a salt component comprising a water soluble salt and an alkali base. In certain embodiments the dye component may further comprise a surfactant. According to these embodiments, the reactive dye composition may be any of the reactive dye compositions described herein. The reactive dye composition may comprise from about 5.0% to about 30.0% of the total weight of the rejuvenation system. The enzyme may be any acceptable enzyme as set forth herein. In certain embodiments, the enzyme may be a cellulase, such as, but not limited to those described herein. According to these embodiments, the enzyme may comprise from 0% to about 1.0% of the weight of the rejuvenation system. Further, in those embodiments which comprise a surfactant, such as any of the surfactants set forth herein, the surfactant may comprise from 0% to about 10.0% of the weight of the rejuvenation system and in other embodiments, the system by comprise from 0% up to 2.0% of surfactant.

The salt component of the rejuvenation system comprises at least a water soluble salt and an alkali base. Suitable water soluble salts include those set forth herein. Suitable alkali base include those set forth herein. In one embodiment, the water soluble salt may comprise from about 35.0% to about 90.0% of the weight of the rejuvenation system. The alkali base may comprise from about 0.5% to about 40.0% by weight of the rejuvenation system. According to certain embodiments, the salt component of the rejuvenation system, or a portion of the salt component, for example the water soluble salt or the alkali base, may be added at the manufacturing facility. In other embodiments, the salt component, or a portion of the salt component, such as the water soluble salt of the alkali base, may be added by the consumer or a user of the system. For example, to save on certain costs associated with manufacturing or shipping the rejuvenation system, in certain embodiment the consumer or user of the system may supply the water soluble salt and/or the alkali base. According to these embodiments, economic benefits, including for example, reduced consumer price, reduced packaging costs, and/or reduced shipping costs, may be derived from the consumer supplying at least a portion of the salt component. These embodiments of the rejuvenation system may further comprise directions for the system user to instruct them on the amount and type of water soluble salt (such as, for example, NaCl) and/or alkali base (such as, for example, $NaHCO_3$, $Na_2CO_3$, $Na_2SiO_3$, NaOH and the like) that should be added to the rejuvenation system for optimum dye uptake.

In certain embodiments of the rejuvenation compositions, the salt may be added separately, for example by an end user of the composition. In these embodiments, the percentage of reactive dye in the rejuvenation composition formulation may range from about 25% to about 45% by weight of the rejuvenation composition. The percentage of base in the composition formulation may range from about 50% to about 70% by weight of the rejuvenation composition. The percentage of surfactant and/or wetting agent in the rejuvenation composition formulation may range from about 0% to bout 5% by weight of the rejuvenation composition. The percentage of enzyme in the rejuvenation composition formulation may range from about 0% to about 1% by weight of the rejuvenation composition.

According to certain embodiment, the salt component may be substantially free of phosphate salts. As discussed above, in certain jurisdictions, such as the United States, the use of phosphates may be restricted, for example, for environmental concerns of the waste phosphate salts being discharged into the water table. Therefore, certain embodiments of the rejuvenation system are substantially free of phosphate salts.

Still other embodiments of the rejuvenation systems of the present disclosure may further comprise a wax or repellent pen or applicator. The wax or repellent pen or applicator may be used to treat a portion of the textile or garment such that the treated portion does not react with the reactive dye composition. That is, with certain garments there may be portions of the textile which the owner does not wish to react with the dye. For example, certain garment may have a tag, such as an identification tag, or alternatively, the garment may have one or more designs which the owner does not wish to react with the dye. For these garments, the rejuvenation system may include the wax or repellent pen or applicator, where a wax or other repellent material may be applied to the textile surface that is not to be dyed, thereby creating a barrier to the reactive dye. This barrier prevents the dye from contacting the fabric surface and therefore prevents reaction of the reactive dye with the fabric treated with the pen or applicator. The wax or other repellent material may then be removed by washing the garment after the rejuvenation process or alternatively treating the textile surface with a composition capable or removing the wax or other repellent material.

In certain embodiments of the rejuvenation system, the textile treated with the rejuvenation system may display an L* value of less than about 15 after treatment. In other embodiments, the textile garments treated with the rejuvenation compositions of the present disclosure may display a $DE^*_{CMC}$ value of greater than 1.0 units. In other embodiments, the $DE^*_{CMC}$ value of treated textile garments may be greater than 5.0 units. According to certain embodiments, textile garments treated according to the methods utilizing the various embodiments of the rejuvenation compositions of the present disclosure may display a $DE^*_{CMC}$ value of greater than 2.5 units.

Other embodiments of the present disclosure provide for methods of rejuvenating the color of textile garments. As will be understood by one having skill in the art, the various methods may depend on the type of washing machine used to treat the garment with the rejuvenation compositions and systems of the present disclosure. For example, since different washing machine types may have different wash volumes, the amount or dosage of the rejuvenation composition or system used to treat the textile may vary. Further, in certain industrial laundering facilities, the water temperature and/or cycle time may be higher and/or longer, respectively. Since the chemical reaction rate of the reactive dye is both temperature and rate dependent, in such an industrial situation different dosages of the rejuvenation composition or system may be used.

According to one embodiment, the present disclosure provides a one-use method for rejuvenating the color, for example, the black color, of textile garments in a front-loader type washing machine or a Miele-type washing machine. According to these embodiments the method comprises adding a dosage unit of a textile rejuvenation composition comprising a reactive dye, a water soluble salt, an alkali base, a surfactant, and an enzyme, such as those rejuvenation compositions described herein, to the wash compartment. The rejuvenation composition may be substantially free of phosphates. The dosage unit may be sufficient to provide a true black color on the treated textile. For example, in certain embodiments, the dosage unit may range from 50 g to 500 g of the rejuvenation composition. The method further comprises adding sufficient volume of water having a temperature ranging from about 25° C. to about 60° C. to the wash compartment to produce a rejuvenation mixture. In certain embodiments, the volume the added water may range from about 10 L to about 15 L. In other embodiments, the volume of added water may range from 5 L to 10 L. The method further comprises agitating the rejuvenation mixture for a time sufficient to disperse and/or dissolve the textile rejuvenation composition in the rejuvenation mixture. The method further comprises adding from 1 to 5 garments to the wash compartment of the washing machine where the total weight of the garment load is from about 75 g to 1000 g of garments to the wash compartment. The method comprises agitating the garments in the rejuvenation mixture for a sufficient time to fully contact the rejuvenation mixture with the fabric of the garments and then soaking the garments in the rejuvenation mixture for sufficient time to allow the reactive dye to react with the functional groups on the surface of the fabric of the garments. The garments may be soaked for a time ranging from about 30 minutes to 240 minutes. The method further comprises draining the rejuvenation mixture from the wash compartment, rinsing the treated garments with water, and treating the dye treated garments to a wash/rinse cycle in the washing machine using a cold setting without additional cleaning, laundering or treating products. In certain embodiments, it may be desirable to treat the dyed garments to one or more additional wash/rinse cycles to ensure complete removal of the rejuvenation mixture from the garment and the wash compartment.

According to another embodiment, the present disclosure provides a one-use method for rejuvenating the color, for example, the black color, of textile garments in a top-loader type washing machine. According to these embodiments the method comprises adding a dosage unit of a textile rejuvenation composition comprising a reactive dye, a water soluble salt, an alkali base, a surfactant, and an enzyme, such as those rejuvenation compositions described herein, to the wash compartment. The rejuvenation composition may be substantially free of phosphates. The dosage unit may be sufficient to provide a true black color on the treated textile. For example, in certain embodiments, the dosage unit may range from 100 g to 1200 g of the rejuvenation composition. The method further comprises adding sufficient volume of water having a temperature ranging from about 18° C. to about 60° C. to the wash compartment to produce a rejuvenation mixture. In certain embodiments, the volume of the added water may range from about 35 L to about 40 L. The method further comprises agitating the rejuvenation mixture for a time sufficient to disperse and/or dissolve the textile rejuvenation composition in the rejuvenation mixture. The method further comprises adding from 1 to 5 garment to the wash compartment of the washing machine or alternatively, adding from about 75 g to 1000 g of garments to the wash compartment. The method comprises agitating the garments in the rejuvenation mixture for a sufficient time to fully contact the rejuvenation mixture with the fabric of the garments and then soaking the garments in the rejuvenation mixture for sufficient time to allow the reactive dye to react with the functional groups on the surface of the fabric of the garments. The garments may be soaked for a time ranging from about 30 minutes to 240 minutes. The method further comprises draining the rejuvenation mixture from the wash compartment, rinsing the treated garments with water, and treating the dye treated garments to a wash/rinse cycle in the washing machine using a cold setting without additional cleaning, laundering or treating products. In certain embodiments, it may be desirable to treat the dyed garments to one or more additional wash/rinse cycles to ensure complete removal of the rejuvenation mixture from the garment and the wash compartment.

According to another embodiment, the present disclosure provides a one-use method for rejuvenating the color, for example, the black color, of textile garments in an industrial or commercial washing facility, such as in laundromats, dry cleaning and other industrial or commercial textile cleaning facilities. According to these embodiments the methods these facilities may utilize washing machines capable of increased wash capacity, greater agitation, increased wash temperatures, and/or increased washing times. Therefore, the various steps of the methods may be similar to those for front-loader, Miele, or top-loader washing machines. However, in industrial or commercial settings, larger wash volumes may be used and therefore greater dosage units of the rejuvenation composition may be used. In addition, a larger number or weight of garments may be treated in a single cycle. In certain embodiments, the water temperature may be increased to range from about 30° C. up to about 70° C. and/or the overall treatment time may be longer, for example, from 60 minutes to 240 minutes or longer. As discussed herein, treating the textile at higher temperatures and/or longer reaction times may result in greater uptake of the dye by the fabric. Therefore, in certain embodiments it may be possible to use lower dosages of the rejuvenation composition and achieve a similar color for the treated garment.

As discussed herein, the dose of the textile rejuvenation composition added to a rejuvenation process may vary depending on, for example, the washing machine type, the number or weight of garments being treated, the starting color of the garments being treated, the temperature of the water, the length of treatment time, and/or other possible variables as set forth herein. Accordingly, it may be desirable to provide the textile rejuvenation compositions of the present disclosure in prepackaged units that may be added by the consumer or user in the appropriate amount to give the desired overall dose of the rejuvenation composition, depending on the several factors discussed herein. Various dosage formats may be used with the compositions and systems described herein. For example, suitable dosage devices and containers include pouches, including but not limited to foil or plastic pouches or water soluble pouches, such as but not limited to, a polyvinyl alcohol (PVA) pouch; dosing balls or containers; containers with readily opened closures, such as pull tabs, screw caps, foil or plastic covers, and the like; or other container known in the art. In other embodiment, the compositions of the present disclosure may be formulated into tablet having a premeasured amount of the composition. According to these dosing formats, an appropriate number of dosing devices containing premeasured quantities of the composition may be readily added to the process, while minimizing exposure to the components of the composition or potential unwanted dying due to contact of the dye with other objects.

In another embodiment of the present disclosure, the compositions described herein may be provided as a particular composition comprising one or more particulate components and enclosed in a water-miscible film termed herein as a "pouch". The pouch may comprise at least one compartment to contain the particulate composition, and optionally one or more other compartments to contain a liquid or other particulate composition. Enclosing the compositions in a pouch may provide a benefit as the pouch provides a barrier between the composition and direct contact with the consumer or user. This shields the user from any potentially sensitizing and/or caustic components of the composition, allows for convenient dosing and minimizes potential spillage of the composition.

The compositions of the present disclosure are preferably water-miscible, to be delivered to water and thus, the pouch and the compartment(s) thereof are designed so at least one or more of the components are released at, or very shortly after, the time of addition to the water. Thus, the compartment(s) and in specific embodiments, the pouch may be formed from a material which is water-dispersible or water soluble. According to certain embodiments, the composition or component(s) may be delivered to the water within 3 minutes after contacting the pouched composition to water and in other embodiments within 2 minutes or even within 1 minute from contact.

According to certain embodiments, the water-dispersible material may have a dispersibility of at least 50%, and in other embodiments at least 75% or even at least 95%, as measured by the method sets forth herein, including gravimetric methods using a glass-filter with a maximum pore size of 50 microns or alternatively, 20 microns. For example, 10 g±0.1 g of material is added to a 400 mL tared beaker and 245 mL±1 mL of distilled water is added. The solution is stirred vigorously at 600 rpm for 30 minutes and then the solution filtered through a folded qualitative sintered-glass filter with the pore size defined above. The water is evaporated from the filtrate by any conventional method and the weight of the remaining water dispersible polymer from the dissolved fraction is determined. The percent solubility or dispersibility may then be calculated.

According to certain embodiments, the materials for forming the pouch are polymeric materials, such as polymers in the form of a film or sheet. Suitable polymeric materials include, but are not limited to, polyvinyl alcohols; polyvinyl pyrrolidone; polyalkylene oxides; (modified) cellulose; (modified) cellulose-ethers, -esters or -amides; polycarboxylic acids and salts including polyacrylates; copolymers of maleic/acrylic acids; polyaminoacids or peptides; polyamides, including polyacrylamide; polysaccharides, including starch and gelatine; natural gums, such as xanthan gum and carragum. In specific embodiments, the polymer may be selected from polyacrylates and acrylate copolymers, including polymethacrylates; methylcellulose; sodium carboxymethylcellulose; dextrin; maltodextrin; ethylcellulose; hydroxyethyl cellulose; and hydroxypropyl methylcellulose. In other embodiments, the polymer may be polyvinyl alcohols, polyvinyl alcohol copolymers, and/or hydroxypropyl methylcellulose. The polymer may have any suitable weight average molecular weight, such as, for example, from about 1,000 to about 1,000,000, alternatively from about 10,000 to about 300,000, from about 15,000 to about 200,000, or from about 20,000 to about 150,000. Examples of water-miscible or water soluble pouches suitable for use with the various embodiments of the present disclosure including methods of forming such pouches are further described in detail in PCT Publication Nos. WO 01/85898; WO 01/83667; and WO 01/83657, and in British Patent Nos. GB2361685; GB2361686; GB2361687; GB2361688; GB2361689; GB2361690; and GB2361707.

The pouch described herein may comprise a closed structure enclosing a volume space which comprises the composition. Thus, the pouch may be of any form, shape and material which is suitable to hold the composition prior to use, e.g., without allowing release of the composition from the pouch prior to contact of the pouched composition to water. The exact execution will depend on, for example, the type and amount of the composition in the pouch, the number of compartments in the pouch, and/or the characteristics required from the pouch to hold, protect and deliver or release the composition.

According to certain embodiments, the pouch may be of such a size that it conveniently contains either a unit dose amount of the composition or an increment of that unit dose. For example, when it is desired to offer the composition in a unit dose, the pouch may comprise the entire unit dose of rejuvenation composition, for example from about 50 g to about 1000 g of composition, or from about 250 g to about 500 g of the composition. Alternatively, when it is desired to offer the rejuvenation composition in incremental doses, the pouch may comprise from about 25 g to about 250 g of the rejuvenation composition. In one example, a single pouch may contain a certain weight of the composition, for example 100 g of the rejuvenation composition. Therefore, in a front-loader washing machine that may require 400 g of rejuvenation composition, the user can add 4 pouches to the wash compartment. Since the rejuvenation composition and the reactive dye are provided in a closed container, such as a pouch or container that is not opened until the composition is to be poured into the washing device (such as into the dispenser drawer or drum of the washing machine), there is less mess associated with adding the appropriate amount of the composition to the wash compartment.

Alternatively, the rejuvenation composition may be formulated in a solid pelletized, tablet, or particulate form. In the pelletized form, the pellets of the rejuvenation composition may be of sufficient size to be readily measured, for example, pellets having a mesh size ranging from about 250 µm to about 750 µm. Pellets or tablets may be readily measured by volume or weight and added to the wash compartment. Utilizing a pelletized or tablet form may result in less fine particulates and mess associated with a powder formulation. Examples of laundry care tablets and methods of forming tablets are disclosed in PCT Publication Nos. WO 99/50381; WO 99/55821; and WO 99/55822, European Patent Nos. EP896052 and EP947443 and British Patent Nos. GB2324495 and GB2332442.

In still other embodiments, the rejuvenation composition or system may comprise two or more separated components such as at least one liquid component and at least one solid component, two or more separate liquid components or two or more separate solid components. According to these embodiments, the two separate components of the composition or system may be mixed immediately prior to or during the rejuvenation process. In certain non-limiting embodiments, the composition may comprise two separate components that are provided in a dosing container having two separate compartments. In one embodiment, the dosing device may be a compartmentalized container with separate rejuvenation components that may be mixed when placed in the drum or dispensing compartment of the device. In other embodiments, the dosing device may be a compartmentalized water soluble pouch or a compartmentalized dosing ball that releases the rejuvenation components during the rejuvenation process (e.g., upon contact with the aqueous environment inside the washing machine). In one embodiment, the pouch may have one or more compartments, where at least one of the compartments contains the particulate or solid components material(s) and at least one second compartment that contains the liquid component material(s).

While various specific embodiments have been described in detail herein, the present disclosure is intended to cover various different combinations of the disclosed embodiments and is not limited to those specific embodiments described herein. The various embodiments of the present disclosure may be better understood when read in conjunction with the following representative examples. The following representative examples are included for purposes of illustration and not limitation.

EXAMPLES

Example 1

Six sample formulations of the textile rejuvenation compositions of the present disclosure are prepared. The compositions comprise a reactive dye composition (EVERZOL® Black ED), one or more water soluble salt, an alkali base, and one or more surfactant or wetting agents (linear alkylbenzene sulfonates (LAS), dioctyl sodium sulfosuccinate (DSS)). The compositions may also comprise a cellulase enzyme (CAREZYME®) and adjunct ingredients (PLURAFAC® SLF-18 and SIPERNAT® 22). The formulations are substantially free of phosphate salts. The formulations of the six rejuvenation compositions are presented in Table 1.

TABLE 1

Textile Rejuvenation Composition Formulations

| Ingredients | Formulation I | Formulation II | Formulation III | Formulation IV | Formulation V | Formulation VI |
|---|---|---|---|---|---|---|
| Water soluble salt | NaCl 500 g (86.8%) | NaCl 127.5 g (39.7%) | NaCl 191.1 g (59.5%) | NaCl 187.3 g (62.4%) | NaCl 240 g (58.4%) | NaCl 62.5 g (58.4%) |
| Alkali base | NaOH 40 g (6.9%) | Silicate 127.5 g (39.7%) | Silicate 81.9 g (25.5%) | Silicate 80.3 g (26.8%) | Silicate 100 g (25.1%) | Silicate 26.9 g (25.1%) |
| Reactive dye (EVERZOL ® Black ED) | 30 g (5.2%) | 60 g (18.7%) | 40 g (14%) | 30 g (10%) | 56 g (14.1%) | 15.1 g (14.1%) |
| Surfactant | DSS 0.5 g (0.1%) LAS 5 g (0.9%) | DSS 1.0 g (0.3%) LAS 5 g (1.6%) | DSS 0.5 g (0.2%) LAS 2.5 g (0.8%) | DSS 0.5 g (0.2%) LAS 1.6 g (0.5%) | DSS 0.4 g (0.1%) LAS 3.2 g (0.8%) | DSS 0.2 g (0.1%) LAS 0.9 g (0.8%) |
| Enzyme | CAREZYME ® 0.6 g (0.1%) | CAREZYME ® 0.4 g (0.1%) | CAREZYME ® 0.4 g (0.1%) | CAREZYME ® 0.4 g (0.1%) | CAREZYME ® 0.4 g (0.1%) | (0%) |
| Adjunct & Processing Ingredients | (0%) | (0%) | (0%) | (0%) | (0%) | PLURAFAC ® SLF-18 1.1 g (1.0%) SIPERNAT ® 22 0.6 g (0.6%) |
| Total weight | 576 g | 321.4 g | 321.4 g | 300 g | 400 g | 107 g |

Example 2

Dosage for Water-Miscible Pouch

In this Example, the rejuvenation composition is provided as a granular composition in a water-miscible pouch. The process for making the granule is also disclosed.

To make the granular rejuvenation composition having the composition listed in Formula VI (Example 1), two premixes are made. Premix 1 comprises sodium chloride (NaCl, 500 micron granules) and CALSOFT® F 90 (sodium linear alkylbenzene sulfonate surfactant flake commercially available from Pilot Chemical Company, Cincinnati, Ohio) in a 77.4% to 22.6% ratio by weight, respectively. Premix 2 comprises NaCl and dioctyl sulfosuccinate (DSS) in a 95.6% to 4.4% ratio by weight, respectively. Each premix is prepared by grinding the solid components together using a kitchen blender. The granule composition for the water miscible pouch application is presented in Table 2.

TABLE 2

Granule Composition.

| Ingredient | Formulation IV | Percent (by weight) |
|---|---|---|
| Water soluble salt | NaCl | 58.4% |
| Alkali base | Sodium metasilicate (anhydrous) | 25.1% |
| Reactive dye | EVERZOL ® Black ED | 14.0% |
| Surfactants | DSS | 0.1% |
|  | CALSOFT ® F 90 LAS | 0.8% |
| Processing aids | PLURAFAC ® SLF 18 (dedusting) | 1.0% |
|  | SIPERNAT ® 22 LS (flow aid) | 0.6% |

Anhydrous sodium metasilicate (850 micron granules) is coarsely ground and sieved through a mesh screen to obtain a mean particle size of approximately 500 microns, similar to the size of the NaCl granules to prevent segregation on further handling. To facilitate dissolution of the product and also to prevent dustiness, the majority of the particles of the granule composition range from about 200 microns to about 1000 microns (in certain embodiments from about 250 microns to 700 microns and in still other embodiments from about 300 microns to about 550 microns). The lower particle size limit is set to prevent aerolization and is consistent with I&HS practices in the plan environment. In addition, the particle size aid in preventing migration of small particles onto the edges of the PVA film and thereby prevents interference with the sealing process and increases the effectiveness of the seal.

The remaining NaCl, sodium metasilicate (anhyd), premix 1, premix 2 and Everzol Black ED (reactive black dye) are added into a batch paddle mixer and the PLURAFACO® SLF 18 (a dedusting agent comprising a surface active nonionic surfactant, commercially available from BASF, Florham Park, N.J.) is sprayed onto the powder mix under mixing followed by addition of the SIPERNAT® 22LS (fumed silica flow aid, commercially available from Degussa Aktiengesellschaft Corp., Germany) to improve flow properties and reduce caking. The addition of the PLURAFAC® SLF 18 not only reduces dust but also makes the dye particles adhere to the surface of the NaCl granules and the sodium metasilicate granules, thus providing a more uniform looking product and preventing contamination of surrounding areas by fine dye particles.

Example 3

Process for Making a Pouch Filled with Composition

In this Example the particulate compositions in incorporated into a pouch. A piece of Chris-Craft M-8900 polyvinyl alcohol (PVA) film (commercially available from Chris-Craft Industrial Products, Gary, Ind., 50 microns thick) is placed on top of a mold and fixed in place. The mold consists of a square shape measuring 30 mm along each side and a depth to provide a volume sufficient to contain the desired amount of rejuvenation composition. The mold is equipped with holes in the mold material to allow a vacuum to be applied. A vacuum is applied to pull the film into the mold and to pull the film flush with the inner surface of the mold. The composition in Example 2 (110 g) is poured into the mold such that the mold is filled to from 105% to 115% of the total volume. The composition has a bulk density of 870 g/L and the apparatus is slightly vibrated to compact the composition. A sheet of M-8900 PVA film is placed over the top of the mold and composition and sealed to the first layer of film by applying an annular piece of flat metal ring having an inner diameter of 46 mm and heating that metal under moderate pressure to heat-seal the PVA films together using the following parameter: temperature=100° C., time=3 sec. pressure=9.6 atm, vacuum applied=0.4 atm. The metal ring is heated to a temperature of 140° C. to 146° C. and applied for up to 5 seconds. During the sealing, the film is stretched, resulting in a thickness variation of between 20 and 40 microns.

The resulting pouches release the product composition upon immersion in 5 L of water at 10° C. in less than 10 seconds. The pouches have a seal strength of 45 Joules. Pouches of the present compositions may also be manufactured using a high speed manufacturing process as disclosed in U.S. Published Application No. 2005/0034432 A1 or in U.S. Pat. No. 7,127,874.

Example 4

Front Loader-Type Washing Machine

Dye rejuvenation Formulation VI (321 g, Example 1) is added as three 107 g unitized doses in a polyvinyl alcohol film pouch to the washing machine drum of a front loader-type washing machine (Whirlpool Duet). Dry clothes (~1000 g) are added to the drum. The water temperature is set to 40° C. and "Heavy Duty" cycle is selected. The machine is allowed to agitate for 15 minutes and then the wash cycle is paused to allow the garments to soak for an additional 45 minutes. After allowing the dye rejuvenation treatment to fun the full 1 hour, the washing cycle is resumed and allowed to finish agitation, drain and rinse cycles. After completion of the rinse cycle, the clothes are left in the washer and a "Heavy Duty" wash and rinse cycle using the cold/cold setting is run using TIDE® HE detergent (commercially available from The Procter & Gamble Company, Cincinnati, Ohio). The garments are removed from the washing machine and dried normally. The machine is allowed to go through another wash and rinse cycle to ensure removal of any remaining dye rejuvenation composition from the washer.

Example 5

Miele-Type Washing Machine

Dye rejuvenation Formulation V (400 g, Example 1) is added to the washing machine drum of a Miele-type front-loader washing machine. Dry clothes (~1000 g) are added to the drum. The 40° C. cotton cycle is selected and the machine is allowed to run to completion. After completion of the cycle, the clothes are left in the washer and run through a second 40° C. cotton wash and rinse cycle with ARIEL® laundry detergent (commercially available from Procter & Gamble, Cincinnati, Ohio). The garments are removed from the washing machine and dried normally. The machine is allowed to go through another wash and rinse cycle to ensure removal of any remaining dye rejuvenation composition from the washer.

Example 6

Top Loader-Type Washing Machine

Dye rejuvenation Formulation V (800 g total, two doses, Example 1) is added to the washing machine drum of a top loader-type washing machine (Kenmore 80). The water temperature is set to the hot setting and the water level is set to the small load setting. The delicate wash cycle is selected. The wash cycle is started and the contents gently agitated from 1 minute. The wash cycle is paused and the garments (~1000 g) are added to the washer drum. The washer is started and allowed to agitate for 10 minutes. The wash cycle is stopped and the contents are allowed to soak for 50 minutes. After allowing the dye rejuvenation treatment to fun the full 1 hour, the washing cycle is resumed and allowed to finish agitation, drain and rinse cycles. After completion of the rinse cycle, the clothes are left in the washer and a normal wash and rinse cycle using the cold/cold setting is run with TIDE® detergent (commercially available from Procter & Gamble, Cincinnati, Ohio). After completion of the second cycle, the garments are removed from the washing machine and dried normally. The machine is allowed to go through another wash and rinse cycle to ensure removal of any remaining dye rejuvenation composition from the washer.

Example 7

Hand Washing

A dye rejuvenation formulation according to Formula V (200 g, half a dose, Example 1, without added enzyme) is added to a bucket, bin or other suitable container. Appropriate personal protective equipment (i.e., gloves and goggles) are utilized as the contents are highly caustic. Hot water (~4 L) having a temperature of from 40° C. to 65° C. is added to the container and the contents stirred with a spatula. After 5 minutes, dry clothes (~250 g, 1 garment) are added followed the addition of enough hot water for the garment to move freely, if needed. The garment is stirred periodically every 10 minutes over a 1 hour period to achieve even dye rejuvenation coverage of the garment fabric. A longer treatment time will lead to a darker and more evenly distributed garment color. The liquid is discarded from the container. The garment is rung out to remove excess liquid. The garment is rinsed with water until the rinse water is clear. The garment is then washed under typical conditions and dried normally.

Example 8

In this Example, the effect of dose weight of the rejuvenation composition is examined with concomitant pH reduction and compared to the prior art product.

Figure 3:
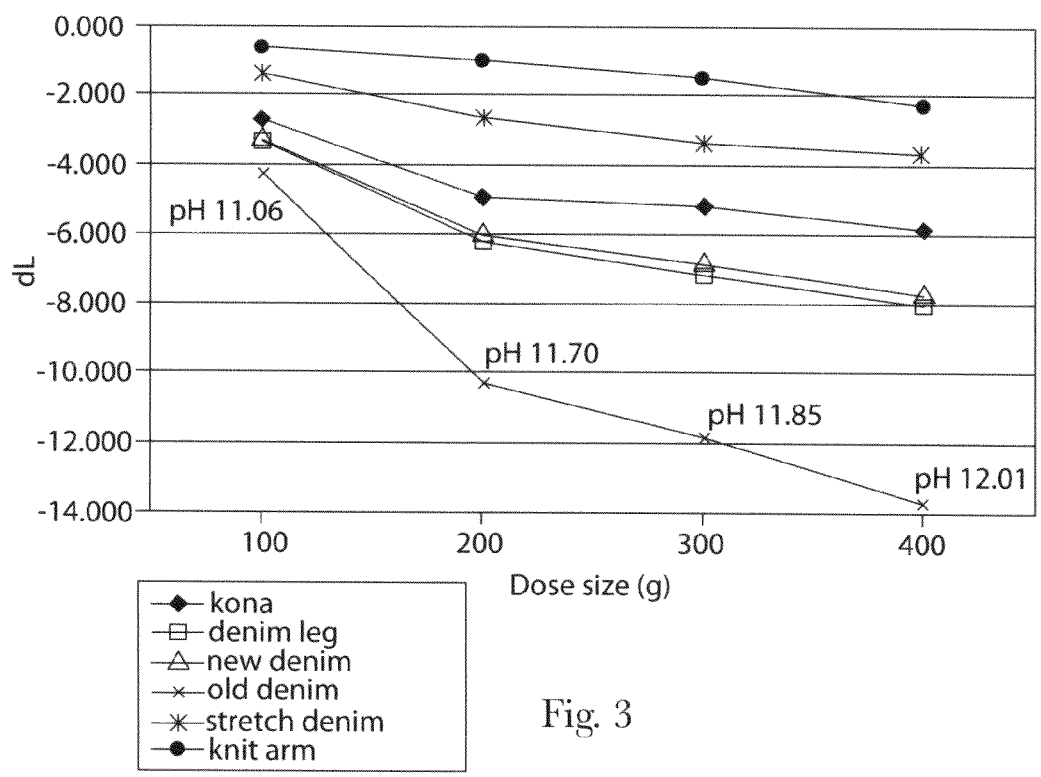
FIG. 3 illustrates the change in L* in garments relative to dosage size of one embodiment of the rejuvenation composition.

Four dosage weights of Formula V (Example 1) are examined for rejuvenating six (6) different fabric types (Kona cotton, 100% cotton denim leg pieces, 100% cotton denim, 97% cotton/3% spandex denim and cotton knit arm) and compared with the commercial dye composition that comprises a phosphate salt (Wash & Dye Black (commercially available from Dylon International Ltd., London, UK)). The effect of pH on dye uptake is also examined as a function of dosage weight. A front-loader type washing machine (Whirlpool Duet) is used for all dye testing. Four levels of Formula V are tested at 100 g, 200 g, 300 g, and 400 g dosage levels with 1 kg of ballast. At 100 g dosage, the pH of the solution is 11.06 and shows reduced dye uptake. For the 100 g dosage level, a run at which the pH of the rejuvenation mixture is adjusted to pH 11.5 is also examined. The dL* (change in L*) of the samples for each fabric at each dosage level for Formula V is measured and the results are presented FIG. 3. The level of dye coloring (measured by dL*) is linear with dose size if the pH of the dye solution is above 11.5. For dosage levels with pH less than 11.5, increasing pH with supplemental NaOH results in linearity with other dosages.

Figure 4:
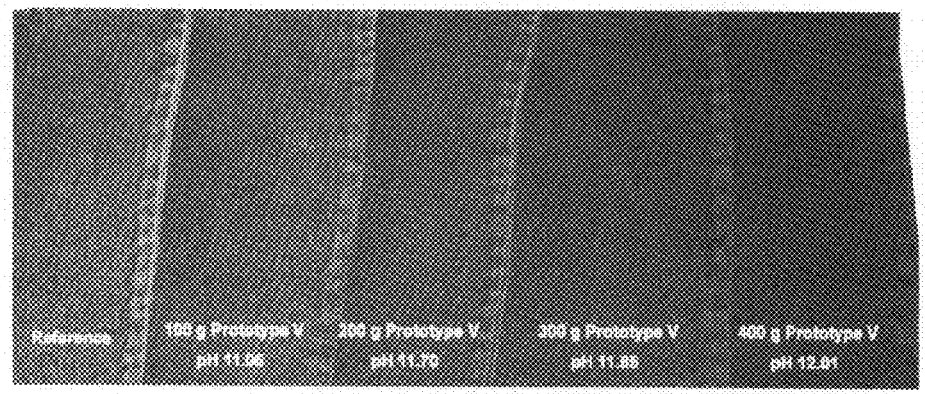
FIG. 4 shows rejuvenation of prewashed denim after treatment with different dosage sizes of one embodiment of the rejuvenation composition.
Figure 5:
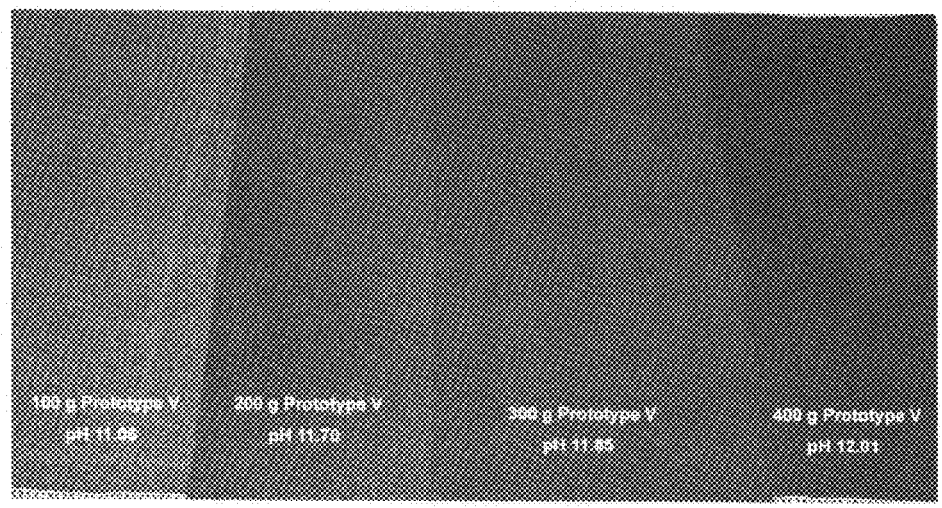
FIG. 5 shows rejuvenation of 100% cotton denim after treatment with different dosage sizes of one embodiment of the rejuvenation composition.
Figure 6:
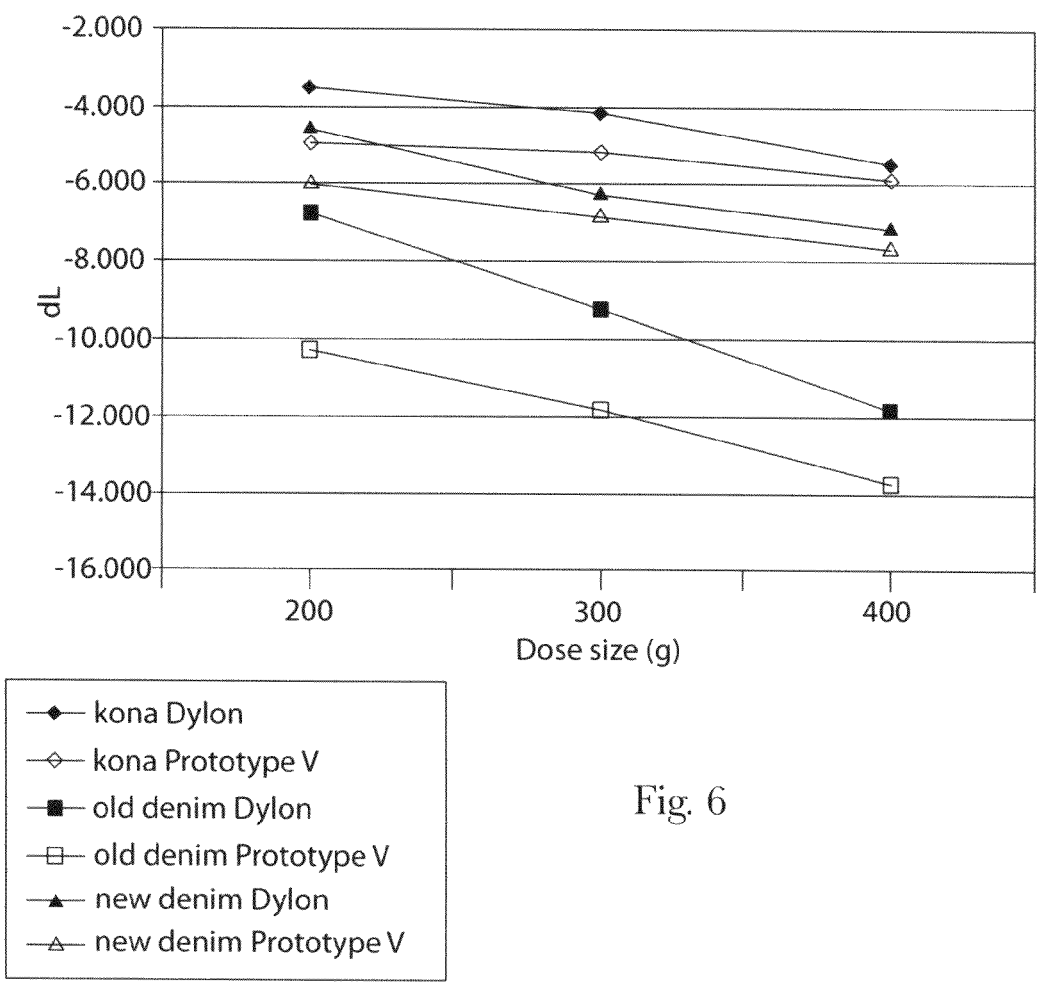
FIG. 6 illustrates the dye results of one embodiment of the present disclosure compared with a commercial product.

Photographs of prewashed 100% cotton denim material re-dyed with different dosage sizes of Formula V are shown in FIGS. 4 and 5, respectively. A comparison of the dye uptake utilizing compositions of the present disclosure against equal amounts of the commercial product is shown in the plot in FIG. 6. The dye uptake shown by Formula V is equal to or better than the commercial product.

Example 9

The dying efficiency and dye uptake of several formulas presented in Example 1 are examined with up to 8 different fabric types. The formulas are examined in North American (NA) top-loader (Kenmore 80) and front-loader (Whirlpool Duet) washing machines and a Miele front-loading machine. The DE* and L* of the fabric swatches are measured and compared to those resulting from use of a commercial product comprising a phosphate salt. The washing parameters are displayed in Table 3. The ballast weight is 1000 g.

TABLE 3

Washing Parameters

| Machine-Type | Wash volume | Temperature | Reaction time | Dose size |
|---|---|---|---|---|
| NA Top-loader | 37.8 L | 40° C. | 60 min | 800 g |
| NA Front-loader | 12.1 L | 40° C. | 60 min | 400 g |
| Miele | 7.5 L | 40° C. | 60 min | 400 g |

The fabric swatches that are tested are Kona cotton, new denim, used (prewashed) denim, used black rib knit, white rib knit (cotton), PC50/50 (50% polyester 50% cotton blend) and PW19 (100% polyester). The fabric types and sources are presented in Table 4. The one-shot washing protocol is as follows. For the NA front-loading, the prescribed dosage of thoroughly mixed dying formula is added to the drum; dry clothes are added to the drum; the city water thermostat is set at 40° C. and the heavy duty wash cycle is selected; the clothes are agitated for 15 minutes then the washer is paused and the load soaks in the solution for 45 minutes; the machine is drained and the rinse cycle started; after the rinse cycle stops, a heavy duty wash and rinse cycle using the cold/cold water setting is selected; the clothes are washed (with optional use of detergent); the clothes are removed from the machine and dried normally; and another wash/rinse cycle is performed to ensure all dye has been removed from the washer. For the NA top-loading machine, the prescribed dosage of thoroughly mixed dying formula is added to the drum of the machine; the city water thermostat is set at 40° C., the small water level is selected and the delicate wash cycle is selected; the drum is allowed to fill with water with gentle agitation for 1 minute; dry clothes are added to the drum; the washer is restarted and the clothes are agitated for 10 minutes then the washer is paused and the load soaks in the solution for 50 minutes; the machine is drained and the rinse cycle started; after the rinse cycle stops, a normal wash and rinse cycle using the cold/cold water setting is selected; the clothes are washed (with optional use of detergent); the clothes are removed from the machine and dried normally; and another wash/rinse cycle is performed to ensure all dye has been removed from the washer. For the Miele machines, the prescribed dosage of thoroughly mixed dying formula is added to the drum and dry clothes are added. The full 40° C. cotton cycle is run. At the end of the cycle it is repeated with optional addition of detergent; the clothes are then removed from the machine and dried normally; another wash/rinse cycle is performed to ensure all dye has been removed from the washer. The color of the fabric samples are analyzed using the L*a*b* color scale. The DE* and L* results for the NA front-loader runs is presented in Table 4, the NA top-loader results are presented in Table 5, and the Miele results are presented in Table 6.

TABLE 4

Fabric Types

| Descriptor | Composition | Color | Prewashed/ Off bolt | Supplier | SKU # |
|---|---|---|---|---|---|
| New Denim | 100% cotton | Black | Off bolt | Rainwood Quality Fabrics | 1103662 |
| Precond Denim | 100% cotton | Black | Prewashed 10x Tide | Rainwood Quality Fabrics | 1103662 |
| Kona | 100% cotton | Charcoal | Off bolt | Robert Kaufman Fabrics | 1697010 |
| Rib Knit | 100% cotton | Black | Prewashed 10x Tide | Hobby Lobby Fabrics | 945584 |
| PW19 | 100% Polyester | White | Off bolt | Empirical Mfg. Co. | L-66202413-1 |
| White Rib Knit | 95% cotton 5% Lycra | White | Off bolt | JoAnn Fabrics | 672-5279 |
| PC 50/50 | 50% Polyester 50% Cotton | White | Off bolt | Empirical Mfg. Co. | L-997 B-4390 |

TABLE 5

Results from NA Top Loader Washing Machine
KENMORE 80 TOP LOADER

| | DE* | | | | | | L* | | | | | |
|---|---|---|---|---|---|---|---|---|---|---|---|---|
| Fabric | Form. I | Form. II | Form. III | Form. IV | Form. V | Dylon | Form. I | Form. II | Form. III | Form. IV | Form. V | Dylon |
| NEW DENIM | 5.02 | 5.26 | 4.30 | 3.65 | 5.48 | 4.54 | 14.27 | 14.30 | 15.16 | 15.83 | 13.85 | 14.63 |
| PRECOND DENIM | 10.40 | 10.12 | 7.80 | 7.35 | 10.31 | 9.69 | 16.27 | 16.87 | 19.11 | 19.60 | 16.45 | 16.85 |
| KONA | 6.41 | 7.77 | 6.65 | 5.48 | 8.29 | 6.56 | 24.01 | 24.04 | 24.36 | 24.89 | 22.25 | 23.64 |
| RIB KNIT | 3.65 | 1.38 | 1.02 | 2.07 | 2.61 | 3.27 | 14.39 | 15.69 | 16.37 | 15.71 | 14.80 | 15.23 |
| PW 19 | 13.17 | 15.77 | 15.92 | 13.66 | | 15.30 | 82.35 | 80.54 | 79.87 | 81.74 | | 80.06 |

TABLE 5-continued

Results from NA Top Loader Washing Machine
KENMORE 80 TOP LOADER

| | DE* | | | | | | L* | | | | | |
|---|---|---|---|---|---|---|---|---|---|---|---|---|
| Fabric | Form. I | Form. II | Form. III | Form. IV | Form. V | Dylon | Form. I | Form. II | Form. III | Form. IV | Form. V | Dylon |
| WHITE RIB COTTON | 74.03 | 71.24 | 68.80 | | 71.04 | 72.64 | 20.25 | 23.17 | 25.55 | | 23.37 | 21.63 |
| PC 50/50 | 63.21 | 62.14 | 58.34 | | 60.90 | 61.24 | 32.23 | 33.39 | 37.16 | | 34.96 | 34.21 |

TABLE 6

Results from NA Front Loader Washing Machine
WHIRLPOOL DUET FRONT LOADER

| | DE* | | | | | | L* | | | | | |
|---|---|---|---|---|---|---|---|---|---|---|---|---|
| Fabric | Form. I | Form. II | Form. III | Form. IV | Form. V | Dylon | Form. I | Form. II | Form. III | Form. IV | Form. V | Dylon |
| NEW DENIM | 6.99 | 5.99 | 6.06 | 4.97 | 7.42 | 6.37 | 12.22 | 13.29 | 13.16 | 14.25 | 11.83 | 12.80 |
| PRECOND DENIM | 12.06 | 11.82 | 9.99 | 8.42 | 13.70 | 12.14 | 14.47 | 14.81 | 16.58 | 18.15 | 12.88 | 14.35 |
| KONA | 6.03 | 7.92 | 6.97 | 5.64 | 9.27 | 7.10 | 23.63 | 22.90 | 23.39 | 24.43 | 21.03 | 22.56 |
| RIB KNIT | 5.42 | 3.70 | 4.43 | 3.42 | 6.21 | 5.77 | 13.28 | 14.29 | 13.96 | 14.93 | 12.20 | 13.31 |
| PW 19 | 17.66 | 15.63 | 15.62 | 13.72 | | 15.05 | 77.90 | 80.86 | 80.45 | 82.12 | | 80.57 |
| WHITE RIB COTTON | 78.77 | 78.19 | 75.76 | 71.58 | 79.15 | 77.62 | 15.50 | 16.09 | 18.52 | 22.70 | 15.18 | 16.72 |
| PC 50/50 | 67.56 | 66.74 | 64.73 | 62.30 | 68.55 | 66.69 | 27.88 | 28.69 | 30.71 | 33.15 | 27.22 | 28.83 |

TABLE 7

Results from Miele Washing Machine
MIELE FRONT LOADER

| | DE* | | | | L* | | | |
|---|---|---|---|---|---|---|---|---|
| a | Form. I | Form. II | Form. V | Dylon | Form. I | Form. II | Form. V | Dylon |
| NEW DENIM | 5.67 | 7.93 | 8.74 | 7.96 | 13.49 | 11.32 | 10.48 | 11.20 |
| PRECOND DENIM | 13.29 | 15.05 | 16.13 | 15.02 | 13.36 | 11.51 | 10.42 | 11.47 |
| KONA | 7.18 | 10.17 | 10.43 | 10.47 | 22.37 | 20.36 | 19.99 | 19.19 |
| RIB KNIT | 7.14 | 7.90 | 8.68 | 8.14 | 12.10 | 10.75 | 10.09 | 11.09 |
| PW 19 | 12.05 | 10.82 | 11.60 | 11.08 | 87.75 | 85.60 | 84.75 | 84.48 |
| WHITE RIB COTTON | 79.66 | 82.33 | 83.11 | 82.32 | 14.66 | 11.99 | 11.21 | 12.01 |
| PC 50/50 | 68.57 | 71.26 | 71.79 | 71.02 | 27.30 | 24.51 | 23.99 | 24.79 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A textile rejuvenation composition comprising:
   from about 5.0% to about 30.0% by weight of a reactive dye composition;
   from about 35.0% to about 90.0% by weight of a water soluble salt;
   from about 5.0% to about 40.0% by weight of an alkali base;
   from 0% to about 10% by weight of a surfactant; and
   from 0% to about 1.0% by weight of an enzyme, wherein the composition is substantially free of phosphates and wherein the water soluble salt is a sodium salt selected from the group consisting of sodium chloride, sodium acetate, a sodium carboxylate, sodium formate and combinations of any thereof.

2. The composition of claim 1, wherein the reactive dye composition comprises a reactive black dye.

3. The composition of claim 2, wherein the reactive dye composition further comprises at least one dye selected from the group consisting of a reactive yellow dye, a reactive orange dye, a reactive red dye, a reactive green dye, and combinations thereof.

4. The composition of claim 2, wherein the reactive dye composition has an extinction coefficient ranging from 40,000 to 45,000 at $\lambda_{max}$ of 595 nm for Reactive Black 5 and an absorbance percentage of at least 77% with respect to the absorbance value at 595 nm for species absorbing in the range of 465-480 nm and an absorbance percentage of at least 70% with respect to the absorbance value at 595 nm for species absorbing in the range of 420-435 nm.

5. The composition of claim 1, wherein the alkali base is selected from the group consisting of sodium hydroxide, sodium carbonate, sodium silicate, sodium bicarbonate, sodium metasilicate, and combinations of any thereof.

6. The composition of claim 1, wherein an aqueous solution of the composition has a pH ranging from about 9 to about 13.5.

7. The composition of claim 1, wherein the enzyme is selected from the group consisting of an amylase, a protease, a lipase, a cellulase, a hemicellulase, a peroxidase, a xylanase, a phospholipase, an esterase, a cutinase, a pectinase, a keratanase, a reductase, an oxidase, a phenoloxidase, a lipoxygenase, a ligninase, a pullulanase, a tannase, a pentosanase, a malanase, a β-glucanase, an arabinosidase, a hyaluronidase, a chondroitinase, a laccase, and combinations of any thereof.

8. The composition of claim 1, wherein the composition is provided in a water-miscible film pouch.

9. The composition of claim 1, wherein the composition has a total weight ranging from about 50 g to about 500 g per unit dosage for a front loader-type washing machine.

10. The composition of claim 1, wherein the composition has a total weight ranging from about 100 g to about 1000 g per unit dosage for a top loader-type washing machine.

\* \* \* \* \*